United States Patent
Foster, II et al.

(10) Patent No.: US 12,260,262 B2
(45) Date of Patent: Mar. 25, 2025

(54) DYNAMIC DATA DRIVEN ORCHESTRATION OF WORKLOADS

(71) Applicant: International Business Machines Corporation, Armonk, NY (US)

(72) Inventors: Clyde Tanner Foster, II, Raleigh, NC (US); John F Gbruoski, Raleigh, NC (US); Mehrdad Ashrafian, Chapel Hill, NC (US); Karl David McCormick, II, Raleigh, NC (US); Joseph Kozhaya, Morrisville, NC (US); John Henry Welborn, Jr., Cary, NC (US)

(73) Assignee: International Business Machines Corporation, Armonk, NY (US)

(*) Notice: Subject to any disclaimer, the term of this patent is extended or adjusted under 35 U.S.C. 154(b) by 240 days.

(21) Appl. No.: 16/990,249

(22) Filed: Aug. 11, 2020

(65) Prior Publication Data
US 2022/0050728 A1 Feb. 17, 2022

(51) Int. Cl.
*G06F 9/46* (2006.01)
*G06F 9/48* (2006.01)
(Continued)

(52) U.S. Cl.
CPC .......... *G06F 9/5083* (2013.01); *G06F 9/4881* (2013.01); *G06F 9/505* (2013.01); *G06F 18/214* (2023.01)

(58) Field of Classification Search
CPC ...... G06F 9/5083; G06F 9/4881; G06F 9/505; G06F 18/214; G06N 20/00; G06K 9/6256
See application file for complete search history.

(56) References Cited

U.S. PATENT DOCUMENTS

| | | |
|---|---|---|
| 9,916,135 B2 | 3/2018 | Dube |
| 10,270,650 B2 | 4/2019 | Goltzman |

(Continued)

FOREIGN PATENT DOCUMENTS

| | | | | |
|---|---|---|---|---|
| CN | 113157421 A | * | 7/2021 | ........... G06F 9/5055 |
| EP | 1839176 B1 | | 6/2018 | |
| WO | WO-2012154177 A1 | * | 11/2012 | ............. G06F 9/505 |

OTHER PUBLICATIONS

Zhang et al., A Proactive Approach to Load Balancing of Workflow Execution in a Saas Environment, IEEE, 2010, 8 pages. (Year: 2010).*

(Continued)

*Primary Examiner* — Diem K Cao
(74) *Attorney, Agent, or Firm* — Heather Johnston (57) ABSTRACT

According to aspects of the present disclosure, systems, methods and computer program products can be provided for dynamic workload orchestration based on data complexity. Methods, computer program products and/or systems are provided for dynamic workload orchestration that perform the following operations: (i) receiving a workload for orchestration; (ii) computing complexity scores for respective portions of the workload, where the complexity scores are computed based at least on parameters describing data associated with the portions of the workload; and (iii) using an orchestration engine to assign the portions of the workload to corresponding compute resources, based on their respective complexity scores.

20 Claims, 6 Drawing Sheets

(51) Int. Cl.
*G06F 9/50* (2006.01)
*G06F 18/214* (2023.01)

(56) References Cited

U.S. PATENT DOCUMENTS

| | | | |
|---|---|---|---|
| 2012/0311586 A1* | 12/2012 | Inagaki | G06F 11/3433 |
| | | | 718/100 |
| 2017/0279734 A1* | 9/2017 | Goncalves | G06F 9/5044 |
| 2017/0293534 A1* | 10/2017 | Auvenshine | G06F 11/1464 |
| 2018/0103088 A1* | 4/2018 | Blainey | H04L 67/10 |
| 2018/0157991 A1* | 6/2018 | Wang | G06N 7/00 |
| 2018/0205616 A1 | 7/2018 | Liu | |
| 2018/0225311 A1 | 8/2018 | Bandopadhyay | |
| 2019/0018671 A1 | 1/2019 | Zhu | |
| 2019/0018703 A1 | 1/2019 | Sedovic | |
| 2019/0097942 A1 | 3/2019 | Gao | |
| 2021/0073028 A1* | 3/2021 | Li | G06F 11/3409 |

OTHER PUBLICATIONS

Zhang et al., An Efficient Deep Learning Model to Predict Cloud Workload for Industry Informatics, Jul. 2018, IEEE, vol. 14, No. 7, pp. 3170-3178. (Year: 2018).*

"Dynamic dispatch", Wikipedia, 5 pages, This page was last edited on Dec. 26, 2019, at 15:28 (UTC), <https://en.wikipedia.org/wiki/Dynamic_dispatch>.

Hentrich et al., "A Pattern Language for Process Execution and Integration Design in Service-Oriented Architectures", Jan. 2009, 60 pages, DBLP, DOI: 10.1007/978-3-642-10832-7_6, <https://www.researchgate.net/publication/220139619_A_Pattern_Language_for_Process_Execution_and_Integration_Design_in_Service-Oriented_Architectures>.

Mell et al., "The NIST Definition of Cloud Computing", Recommendations of the National Institute of Standards and Technology, Special Publication 800-145, Sep. 2011, 7 pages.

* cited by examiner

DYNAMIC DATA DRIVEN ORCHESTRATION OF WORKLOADS

BACKGROUND

The present invention relates generally to the field of application workload processing, and more particularly to dynamic orchestration of application workloads.

The use of containerized applications is increasing in popularity and may even become the norm for developing cloud native applications. Containerized applications provide an operating system-based virtualization method for easily and consistently deploying and running distributed applications. Containers allow for packaging an application along with libraries and other dependencies into a standard unit such that an application can run reliably from one computing environment to another. Containerized applications can be deployed and run in different computing environments without requiring an entire virtual machine for each application.

Additionally, the exponential growth in the volume and variety of data to is leading to increased interest in methods (e.g., artificial intelligence applications, etc.) to process and analyze such data.

SUMMARY

According to one embodiment of the present invention, a computer-implemented method for dynamic workload orchestration based on data complexity is provided. The computer-implemented method includes receiving a workload for orchestration. The computer-implemented method includes computing complexity scores for respective portions of the workload, where the complexity scores are computed based at least on parameters describing data associated with the portions of the workload. The computer-implemented method includes using an orchestration engine to assign the portions of the workload to corresponding compute resources, based on their respective complexity scores.

According to another embodiment, a computer program product for dynamic workload orchestration based on data complexity is provided. The computer program product includes a computer readable storage medium having stored thereon program instructions programmed to receive a workload for orchestration. The computer readable storage medium has stored thereon program instructions programmed to compute complexity scores for respective portions of the workload, where the complexity scores are computed based at least on parameters describing data associated with the portions of the workload. The computer readable storage medium has stored thereon program instructions programmed to use an orchestration engine to assign the portions of the workload to corresponding compute resources, based on their respective complexity scores.

According to another embodiment, a computer system for dynamic workload orchestration based on data complexity is provided. The computer system includes a processor(s) set and a computer readable storage medium, wherein the processor set is structured, located, connected, and/or programmed to run program instructions stored on the computer readable storage medium. The stored program instructions include program instructions programmed to receive a workload for orchestration. The stored program instructions may include program instructions programmed to compute complexity scores for respective portions of the workload, where the complexity scores are computed based at least on parameters describing data associated with the portions of the workload. The stored program instructions include program instructions programmed to use an orchestration engine to assign the portions of the workload to corresponding compute resources, based on their respective complexity scores.

DETAILED DESCRIPTION

According to aspects of the present disclosure, systems, methods, and/or computer program products can be provided to perform dynamic workload orchestration. In particular, systems, methods, and/or computer program products of the present disclosure can apply multiple levels of orchestration (or scheduling) of workloads (e.g., associated with containerized applications, etc.) dynamically based on one or more dimensions associated with workload data, for example, dimensions defined based on targeted schema, data types, volume, and/or variety of data.

As an example, embodiments of the present disclosure can provide for analyzing respective portions of a workload and dynamically computing and/or predicting a complexity score for the respective portions which can be used by a dispatch/orchestration engine to determine which compute resources would be best suited to handle respective portions of the workload. Embodiments of the present invention recognize that efficiencies may be gained by enabling dynamic orchestration of workloads whereby different portions of a workload can by dispatched to appropriate compute resources, rather than limiting the workload processing by the portions that require the most time, resources, etc.

Example Embodiments

Figure 1:
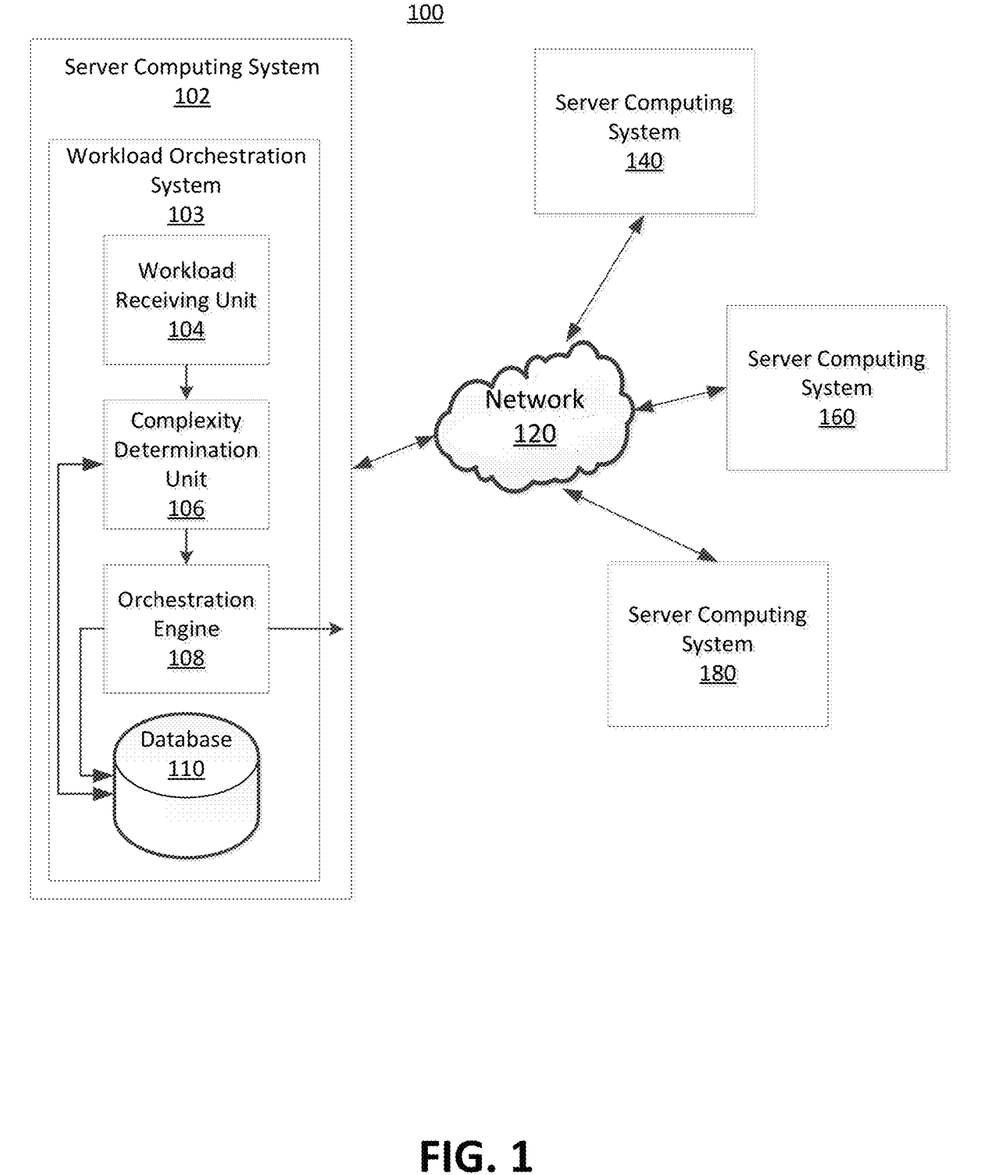
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

In the depicted embodiment, data processing environment 100 includes server computing system 102 and remote server computing systems 140, 160, and 180 interconnected over network 120. As illustrated, server computing system 102 includes workload orchestration system 103 which includes a workload receiving unit 104, a complexity determination unit 106, an orchestration engine 108, and a database 110. Data processing environment 100 may include additional computing devices, mobile computing devices, servers, clients, computers, storage devices, and/or other devices not shown.

Server computing system 102 may be a cloud computing server or any other electronic device or computing system capable of processing program instructions and receiving and sending data. In some embodiments, server computing system 102 may be a laptop computer, a tablet computer, a netbook computer, a personal computer (PC), a desktop computer, a personal digital assistant (PDA), a smart phone, or any programmable electronic device capable of communicating with network 120. In other embodiments, server computing system 102 may represent a server computing system utilizing multiple computers as a server system, such as in a cloud computing environment. In general, server computing system 102 is representative of any electronic device or combination of electronic devices capable of executing machine readable program instructions, as described in greater detail with regard to FIG. 4, in accordance with embodiments of the present invention. As illustrated, server computing system 102 contains a workload receiving unit 104, a complexity determination unit 106, an orchestration engine 108, and a database 110.

Workload orchestration system 103 includes a set of one of more programs designed to carry out operations to provide dynamic workload orchestration in accordance with embodiments of the present disclosure. In the depicted embodiment, Workload orchestration system 103 resides on server computing system 102. In other embodiments, workload orchestration system 103 may reside on one or more of server computing system 140, 160, or 180 and/or on another device (not shown) connected over network 120.

The workload orchestration system 103 can provide for dynamically determining and applying multiple levels of orchestration (or scheduling) of workloads based on workload data complexity. For example, in some embodiments, workload orchestration system 103 can analyze portions of a workload and determine and apply multiple levels of workload orchestration based on a number of factors or parameters associated with the workload. In some embodiments, such factors or parameters can be defined based on targeted schema, data types (e.g., text, images, structured data, unstructured data, etc., and/or a combination of data types), volume of data (e.g., how much data is being captured and processed, how frequently does the volume of data captured change), variety of data (e.g., homogeneous data, combination of different data types, etc.), and/or the like.

The workload receiving unit 104 can receive workload information for one or more data sources. The workload information can be analyzed and organized into respective workload portions to determine orchestration of the workload. In some embodiments, the workload receiving unit 104 and/or the complexity determination unit 106 can extract meaningful metadata from the workload information such as type of data, size of data (number of bytes), variety of data, volume of data, and/or other parameters that could be leveraged in computing complexity scores for respective portions of the workload.

The complexity determination unit 106 can analyze respective portions of the workload and dynamically compute and/or predict a complexity score for the respective portions of the workload. The complexity determination unit 106 can dynamically evaluate the complexity of the workload based on factors/parameters like data type, data size, volume, variety and/or the like for use by the orchestration engine 108 in determining an initial level of workload orchestration.

The complexity determination unit 106 can retrieve information from the database 110 (e.g., policies, rules, run time collected traffic information, operational statistics of the run time environment, etc.) for use in computing complexity scores. In some embodiments, the complexity determination unit 106 and/or orchestration engine 108 can store information associated with computing complexity scores for portions of a workload, information associated with determining compute resources for respective portions of the workload, operational statistics, processing traffic information, and/or the like. The information stored in database 110 can be used for a variety of purposes, such as determining complexity scores for future workloads, generating and/or modifying policies and/or rules for use in complexity score computations, training one or more machine learning models, and/or the like.

In some embodiments, identifying which workload portions may take more processing resources than other portions can be done using machine learning to learn patterns in the workload information data and predict the complexity scores indicative of effort (processing time and required memory) necessary for processing respective portions of the workload based on the data complexity.

The orchestration engine 108 can use the complexity scores for the respective portions of the workload to assign the respective portions to corresponding compute resources (e.g., server computing system 102, server computing system 140, server computing system 160, server computing system 180, etc.) for processing.

The database(s) 110 is a repository for data used by the workload orchestration system 103 (e.g., complexity determination unit 106, orchestration engine 108, etc.). The database(s) 110 can be implemented with any type of storage device capable of storing data and configuration files that can be accessed and utilized by workload orchestration system 103, such as a database server, a hard disk drive, a solid-state drive, a flash memory, and/or the like. In some embodiments, the workload orchestration system 103 can store and/or track information associated with the workloads and the associated processing effort required (e.g., in terms of processing and/or memory requirements, etc.). In some embodiments, the information can be used to train one or more machine learning models to predict the complexity of respective portions of a workload.

As one example, the workload receiving unit 104 can receive workload information consisting of a JavaScript Object Notation (JSON) workload with portions having different parameters. Data processing of some of the portions may require significant resources (e.g., applying AI utilities on unstructured data, etc.) while processing of other portions may require less resources (e.g., aggregation of structured data, etc.). Rather than limiting the complete workload processing by the data types (e.g., portions) that require the most time, the workload orchestration system 103 (e.g., workload receiving unit 104, complexity determination unit 106, etc.) can organize the workload into multiple portions (e.g., portion 1 requiring more resources, portion 2 requiring fewer resources, etc.) and compute complexity scores for the respective portions. The workload orchestration system 103 (e.g., orchestration engine 108, etc.) can assign portion 1 to a first compute resource (e.g., cluster 1) for processing and assign portion 2 to a second compute resource (e.g., cluster 2) for processing based on the complexity scores for each portion. In some embodiments, further load balancing and orchestration can be executed within each cluster.

Network 120 may be a local area network (LAN), a wide area network (WAN) such as the Internet, a wireless local workload orchestration system (e.g., workload receiving unit 104 of workload orchestration system 103, etc.) receives a workload for dynamic workload orchestration. As an example, the following code illustrates a workload where the contents contain properties and metrics using a format called Protobuf that presents a table of data for a table name with the columns and the column order presented first followed by data rows where each row is n-length encoded for each column value. A service can receive a data payload from a collector such as follows:

```
<ENVELOPE>
    <SUBSCRIBER>KVM_defaultSubscription</SUBSCRIBER>
    <REPORTDATA><WRITETIME>1190515171352000</WRITETIME>
    <TMZDIFF>0</TMZDIFF>
    <SQLTABLE><TABLENAME>KVMVM_GEN</TABLENAME>
    <COLUMNS>
        <NAME>ORIGINNODE</NAME>
        <NAME>CLUSTER</NAME>
        <NAME>CS</NAME>
        <NAME>CPU_SHARES</NAME>
        <NAME>CU</NAME>
        <NAME>DATACENTER</NAME>
        <NAME>FIU</NAME>
        <NAME>GS</NAME>
        <NAME>GM</NAME>
        <NAME>GN</NAME>
        <NAME>HOSTNAME</NAME>
        <NAME>MS</NAME>
        <NAME>NODEID</NAME>
        <NAME>NUM_CPUS</NAME>
        <NAME>N0D</NAME>
        <NAME>NON</NAME>
        <NAME>NOS</NAME>
        <NAME>OS</NAME>
        <NAME>PS</NAME>
        <NAME>SSC</NAME>
        <NAME>TIMESTAMP</NAME>
        <NAME>UCM</NAME>
        <NAME>UUID</NAME>
        <NAME>VDU</NAME>
        <NAME>VM_NAME</NAME>
        <NAME>VM_OS_TYPE</NAME>
        <NAME>VPR</NAME>
        <NAME>VSN</NAME>
    </COLUMNS>
    <ROWCOUNT>000144</ROWCOUNT>
    <ROW><![CDATA[0500027VM: vcenter1-sapm-
x3750d:ESX00005X375000009CONNECTED000051600000001000006Austin00011Unavaila
ble00007running00015apm-utbuntu4:LZ00021Ubuntu Linux (64-bit)00012apm-
utbuntu4000053276800048kvm-sapm-vcenter1.tivlab.raleigh.ibm.com_vm-
7420000216000011000011000001000005gre ...
    ...
</ENVELOPE>
``` area network (WLAN), any combination thereof, or any combination of connections and protocols that will support communications between server computing system 102, servers 140-180, and/or other computing devices and servers (not shown), in accordance with embodiments of the inventions. Network 120 may include wired, wireless, or fiber optic connections.

Figure 2:
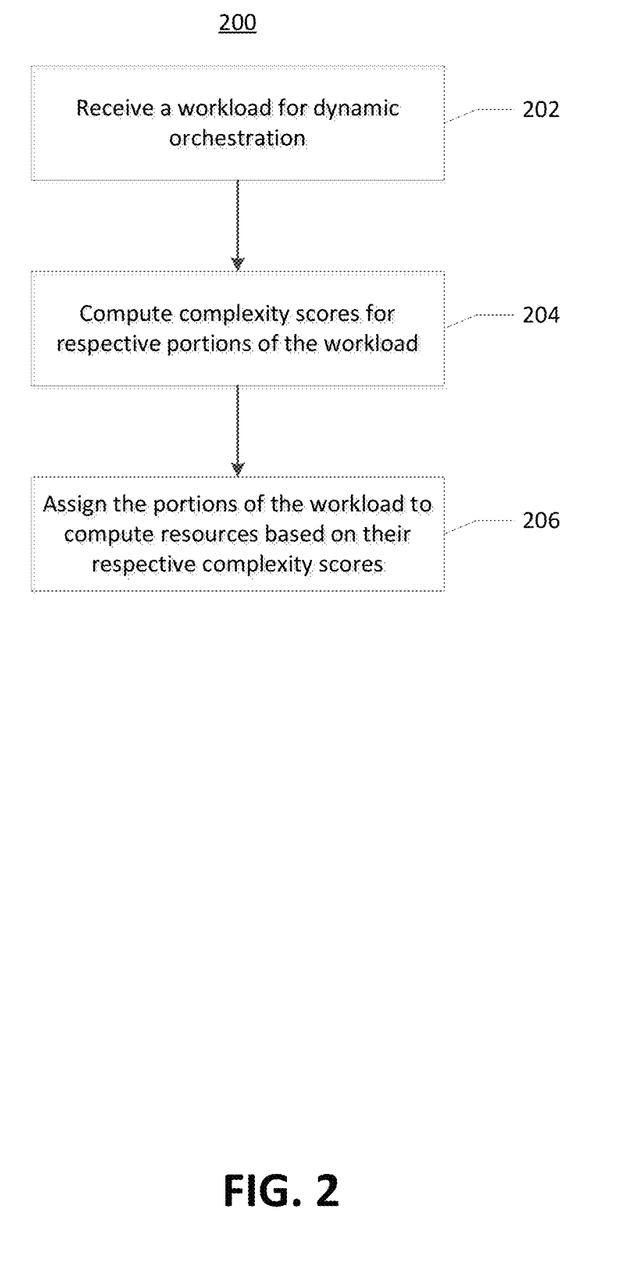
FIG. 2 is a flowchart depicting operational steps of a dynamic workload orchestration system, on a server computer within the data processing environment of FIG. 1, in accordance with an embodiment of the present invention.

FIG. 2 is a flowchart depicting operational steps of a dynamic workload orchestration system generally designated 200, (e.g., workload orchestration system 103, etc.), for example, implemented on a computer (e.g., server computing system 102, etc.) within a data processing environment such as illustrated in FIG. 1, in accordance with an embodiment of the present disclosure.

As illustrated in FIG. 2, in some embodiments, dynamic workload orchestration begins at operation 202, where a Using a definition that describes what this information is and how to process it, the metrics may be associated to a real-world object such as a resource instance that is the subject of the metric observations. This can provide partial information derived from this that had extracted and translated content and is changed to JSON (JavaScript Object Notation). In this example, the data is reporting about a Virtual Machine Instance.

The workload orchestration system can apply information associated with the received workload to build multiple type specific portions out of the received workload. For example, the payload data shown above can be split to describe a resource instance of a virtual machine and the metrics of measurement that apply to it. In this example, a resource instance derived from a payload as illustrated above may resemble:

```
{
    "name": "ibmtest01 : VM:Inst62-ibmucsesx1.itmfvs1:ESX",
    "entityTypes": [
       "vmVirtualMachine"
    ],
    "_id": "wxh42NqWS2ueb-qF58oe8A",
    "uid": "1e2e872c-2916-3c4a-8eab-ba4a951c9299",
    "vm_virtual_machine_memorySize": 1024,
    "_modifiedAt": "2019-01-04T09:06:38.082Z",
    "vm_virtual_machine_powerStatus": "poweredOff",
    "_observedAt": "2019-01-04T13:07:20.146Z",
    "vm_virtual_machine_numberOfDisks": 1,
    "vm_virtual_machine_cpuShares": 1000,
    "vm_virtual_machine_nodeid": "kvm-10.44.184.62_vm-19473",
    "vm_virtual_machine_serverName": "ibmucsesx1.itmfvs1.com",
    "vm_virtual_machine_snapshotStorageConsumed": 0,
    "vm_virtual_machine_datacenter": "HJ-IBMITMFVS",
    "vm_virtual_machine_numCpus": 1,
    "_startedAt": "2019-01-04T09:06:38.082Z",
    "observedTime": 1546607240146,
    "changeTime": 1546592798082,
    "vm_node": "VM:Inst62-ibmucsesx1.itmfvs1:ESX",
    "createTime": 1546517107310,
    "vm_virtual_machine_numberOfNics": 1,
    "vm_virtual_machine_overallStatus": "green",
    "vm_virtual_machine_name": "ibmtest01",
    "_createdAt": "2019-01-03T12:05:07.310Z",
    "vm_virtual_machine_connectionState": "CONNECTED",
    "beginTime": 1546592798082,
    "vm_virtual_machine_numberOfSnapshots": 0,
    "vm_virtual_machine_guestState": "notRunning"
},
And a metric payload may resemble:
{
    "resourceID": "1e2e872c-2916-3c4a-8eab-ba4a951c9299",
    "metrics":
    {
        "vm_virtual_machine_usedCpuMhz": 33,
        "vm_virtual_machine_upTime": 7600,
        "vm_virtual_machine_percentRdy", 10, ...
    },
    "tags":
    {
        "vm_virtual_machine_nodeid": "kvm-10.44.184.62_vm-19473",
        "vm_virtual_machine_serverName": "ibmucsesx1.itmfvs1.com", ...
    }
}
```

In some embodiments, the workload orchestration system extracts metadata (e.g., type of data, size of data, variety of data, volume of data, and/or other parameters) from the workload for using in analyzing the portions of the workload and computing complexity scores for the respective portions of the workload.

At operation 204, the workload orchestration system (e.g., complexity determination unit 106 of workload orchestration system 103, etc.) computes complexity scores for respective portions of the received workload. The complexity scores can be based on data complexity of the workload (e.g., data types, size, volume, variety, etc.) and can be indicative of the predicted processing time and/or memory requirements of the respective portions of the workload. In some embodiments, the workload orchestration system (e.g., complexity determination unit 106, etc.) can apply rules, policies, statistics, and/or the like in computing complexity scores for respective portions of the received workload. In some embodiments, the workload orchestration system (e.g., complexity determination unit 106, etc.) can use one or more machine learned models to compute predicted complexity scores for respective portions of the workload. In such embodiments, information associated with workloads and the associated processing effort required (e.g., in terms of processing and/or memory requirements, etc.) may be tracked (e.g., in database 110 of workload orchestration system 103, etc.) for use in training one or more machine learning models to predict complexity scores.

In some embodiments, one or more parameters/factors associated with portions of the workload can be considered in computing complexity scores for the workload portions. The parameters/factors can include one or more of types of data, size of data, volume of data, variety of data, and/or the like. The types of data can be indicative of whether the workload data is mostly text, images, structured data, unstructured data, Internet of things (IoT) data, and/or a combination of data types. The volume of data can be indicative of how much data is being captured and/or processed and how frequently the volume of data changes. The variety of data can be indicative of whether the workload data is homogeneous or includes a combination of different data types.

In some embodiments, other factors/parameters may be applied in computing complexity scores such as time of day, geography, and/or other events that may impact the complexity of portions of a workload. In some embodiments, the workload orchestration system can initially randomly assign complexity scores (or bins) to the portions of the workload and then over time build rules and/or predictive models for use in computing complexity scores by tracking actual performance requirements for workloads.

At operation 206, the workforce orchestration system (e.g., orchestration engine 108 of workforce orchestration system 103, etc.) assigns the respective portions of the workload to corresponding compute resources based on their respective complexity scores. As an example, portions of the workload that require significant processing may be assigned to compute resources having greater processing capabilities and portions of the workload that require less processing may be assigned to compute resources having standard processing capabilities. So in the example provided above, an arriving payload can independently process to discover and publish resources and simultaneously publish metrics each of which have differing needs and processing requirements. The corresponding compute resources can then perform the processing for the portions of the workload and forward the processing results to other compute resources as necessary for further handling.

Figure 3:
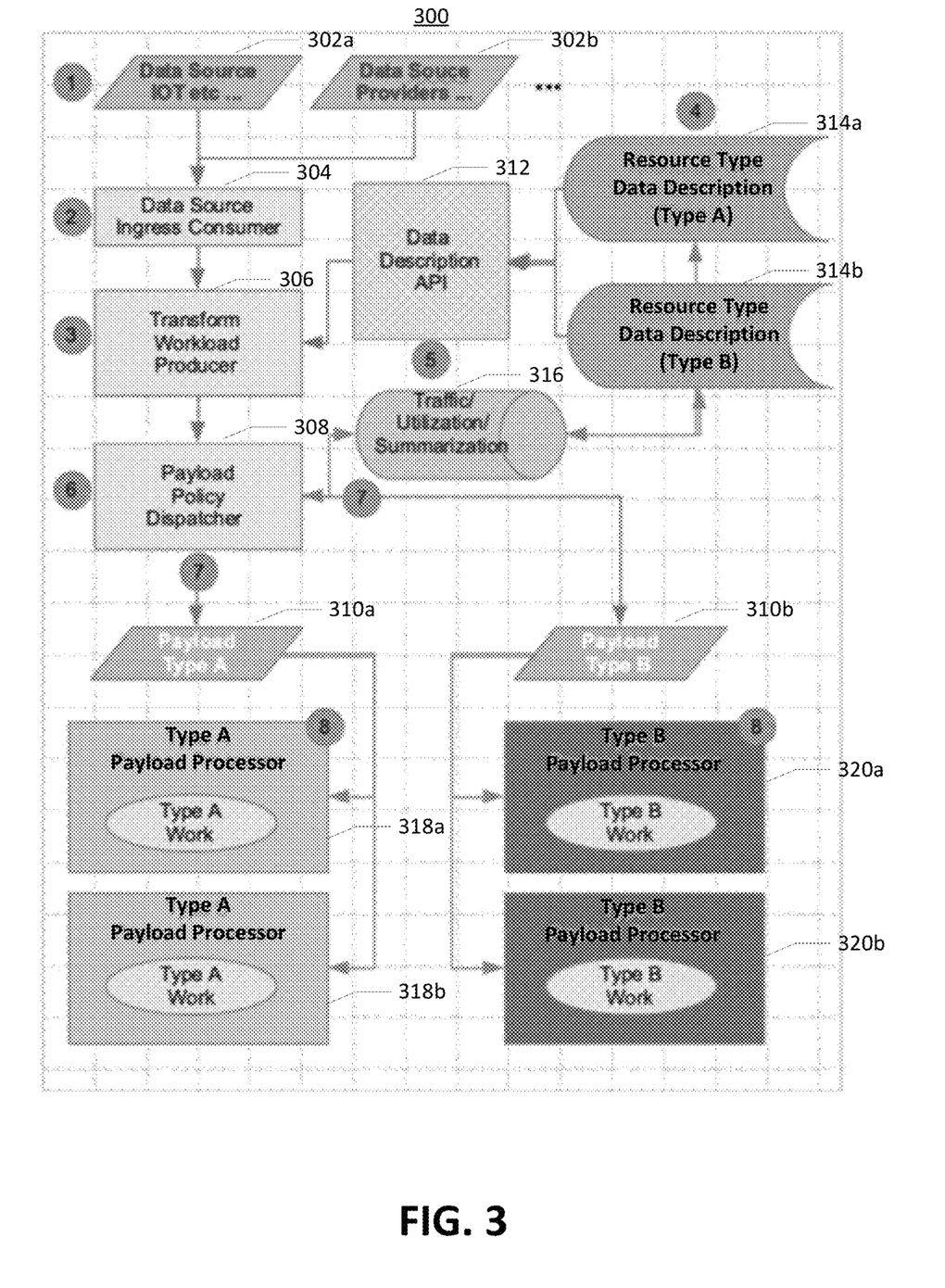
FIG. 3 is a functional block diagram illustrating an example of dynamic workflow orchestration, which may be performed on a server computer within the data processing environment of FIG. 1, in accordance with an embodiment of the present invention.

FIG. 3 is a functional block diagram illustrating an example embodiment of dynamic workflow orchestration 300, which may be performed on a server computer, for example, within the data processing environment of FIG. 1, in accordance with the present disclosure. It should be appreciated that FIG. 3 provides only an illustration of one implementation and does not imply any limitations with regard to the different embodiments which may be implemented in accordance with the present disclosure.

As illustrated in FIG. 3, dynamic workflow orchestration 300 provides for generating and dispatching workload portion types from heterogeneous workload data streams using policy driven dispatching rules for workload type specific partitioning based on data complexity. In some embodiments, a workload type policy may contain rules to describe and control the workload type extraction/transform description and dispatch behaviors. Rules may have access to run time collected traffic information used to contribute operational statistics of the running environment as symbolic names to use in the policy rule scripts or markup.

Information is received from one or more data sources 302a, 302b, etc. where the information is required to be reorganized into separate workload portions to be processed as a workload type. Data source consumer(s) 304 are used to ingress the information.

The transform workload producer 306 generates workload type payloads, for example, using a data description API 312 to access workload type description information defined in workload policies (e.g., resource type data description 314a, 314b). In some embodiments, the data description API 312 can provide access to calling policies responsible for generating new workload portion output that is assigned a given workload type.

Workflow policies (e.g., resource type data description 314a, 314b) can define procedures for how to extract information from offered input to generate workflow portions. In some embodiments, the workflow policy may also contain the description of all parts of the workflow type that characterize a particular workflow definition. In some embodiments, workflow policies may contain a dispatching method. In some embodiments, workflow policies may contain methods for other callback events, such as provisioning.

In some embodiments, the data description API may be used to decide what and how to formulate workflow type instances in the transform workload producer 306.

The payload policy dispatcher 308 is a run time dispatcher that executes according to a workflow dispatcher method as defined in a workflow type policy. The method can use traffic and summarized traffic and utilization information 316 collected over time that reflects run time behaviors for each workflow type. In some embodiments, these may be surfaced as variables or symbolic references that can be used as any part of logical processing in the dispatcher method. Persistence of summarized traffic/utilization 316 can support the ability to use long running values spanning invocations of the workflow dispatcher process.

The payload policy dispatcher 308 delegates generated workflow payloads (e.g., workload portions) 310a, 310b to available compute resources (e., payload processors 318a, 318b, 320a, 320b, etc.) which can be threads, processes, jobs, pods, clusters, and/or the like.

In some embodiments, as delegation occurs, traffic and utilization information 316 may be collected for each workflow type and continuously update the values used by the workflow type dispatcher method.

The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
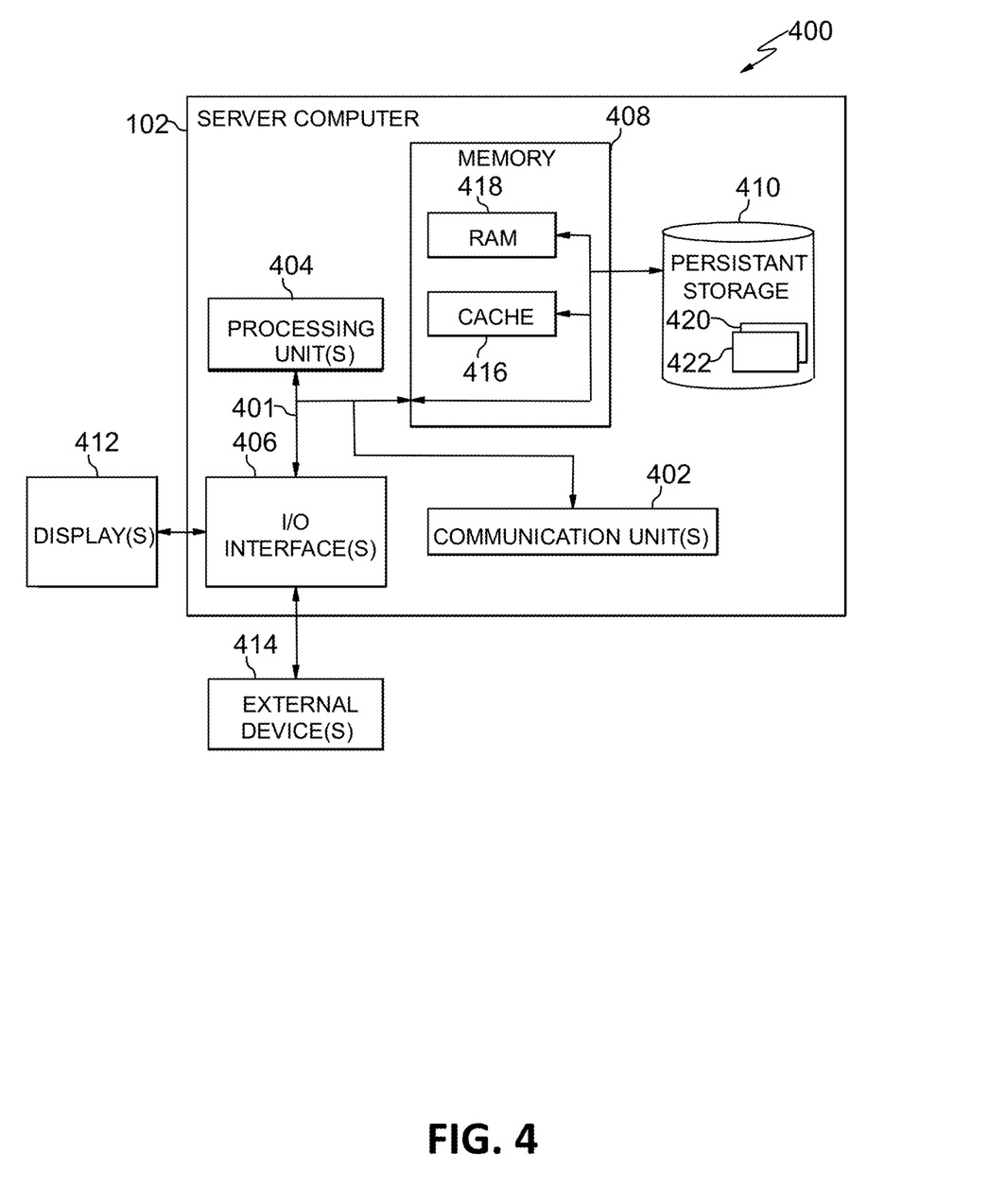
FIG. 4 depicts a block diagram of components of an example server computer operating within the distributed data processing environment of FIG. 1, in accordance with an embodiment of the present invention.

FIG. 4 depicts a block diagram of components of server sub-system 400 in accordance with an illustrative embodiment of the present invention. Server sub-system 400 includes server computer 102, one or more display(s) 412, and one or more external device(s) 414. It should be appreciated that FIG. 4 provides only an illustration of one implementation and does not imply any limitations with regard to the environments in which different embodiments may be implemented. Many modifications to the depicted environment may be made.

Server computer 102 may be a laptop computer, tablet computer, netbook computer, personal computer (PC), a desktop computer, a personal digital assistant (PDA), a smart phone, or any programmable electronic device capable of communicating with the one or more other systems via a network, as illustrated in FIG. 1. As illustrated, server computer 102 includes communications fabric 401, which provides communications between processing unit(s) 404, memory 408 (cache 416, RAM 418, etc.), persistent storage 410, communications unit(s) 402, and input/output (I/O) interface(s) 406. Communications fabric 401 can be implemented with any architecture designed for passing data and/or control information between processors (such as microprocessors, communications and network processors, etc.), system memory, peripheral devices, and any other hardware components within a system. For example, communications fabric 401 can be implemented with one or more buses or a crossbar switch.

Memory 408 and persistent storage 410 are computer readable storage media. As illustrated, memory 408 includes random access memory (RAM) 418 and cache 416. In general, memory 408 can include any suitable volatile or non-volatile computer readable storage media. Cache 416 can be a fast memory that enhances the performance of computer processing unit(s) 404 by holding recently accessed data, and data near accessed data, from memory 408.

Program 420 and program 422 may be stored in persistent storage 410 and/or in memory 408 for execution by one or more of the respective computer processing unit(s) 404, for example, via cache 416. In some embodiments, persistent storage 410 may include a magnetic hard disk drive. Alternatively, or in addition to a magnetic hard disk drive, persistent storage 410 can include a solid-state hard drive, a semiconductor storage device, a read-only memory (ROM), an erasable programmable read-only memory (EPROM), a flash memory, or any other computer readable storage media that is capable of storing program instructions or digital information. Program 420 and program 422 are collections of machine-readable instructions and/or data that can be used to create, manage, and/or control certain software functions, such as discussed in detail above with regard to FIGS. 1-3. As an example, a program 420 and/or program 422 can be a workload orchestration system, a workload receiving unit, a complexity determination unit, an orchestration engine, and/or the like, such as illustrated in FIG. 1.

The media used by persistent storage 410 may also be removable. For example, a removable hard drive may be used for persistent storage 410. Other examples include optical and magnetic disks, thumb drives, and smart cards that are inserted into a drive for transfer onto another computer readable storage medium that is also part of persistent storage 410.

Communications unit(s) 402, in example embodiments, provides for communications with other data processing systems and/or devices. In some example embodiments, communications unit 402 can include one or more network interface cards. Communications unit 402 may provide communications through the use of either or both physical and wireless communications links. In some examples, program 420 and program 422 may be downloaded to persistent storage 410 through communications unit 402.

I/O interface(s) 406 allow for input and output of data with other devices that may be connected to server computer 102. For example, I/O interface(s) 406 may provide a connection to external device(s) 414, such as a keyboard, a keypad, a touch screen, and/or some other suitable input device. External devices 414 can also include portable computer readable storage media such as, for example, thumb drives, portable optical or magnetic disks, memory cards, and/or the like. Software and data used to practice embodiments of the present invention, e.g., program 420 and/or program 422, can be stored on such portable computer readable storage media and can be loaded onto persistent storage 410 via I/O interface(s) 406. I/O interface(s) 406 may also connect to one or more display(s) 412.

Display 412 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
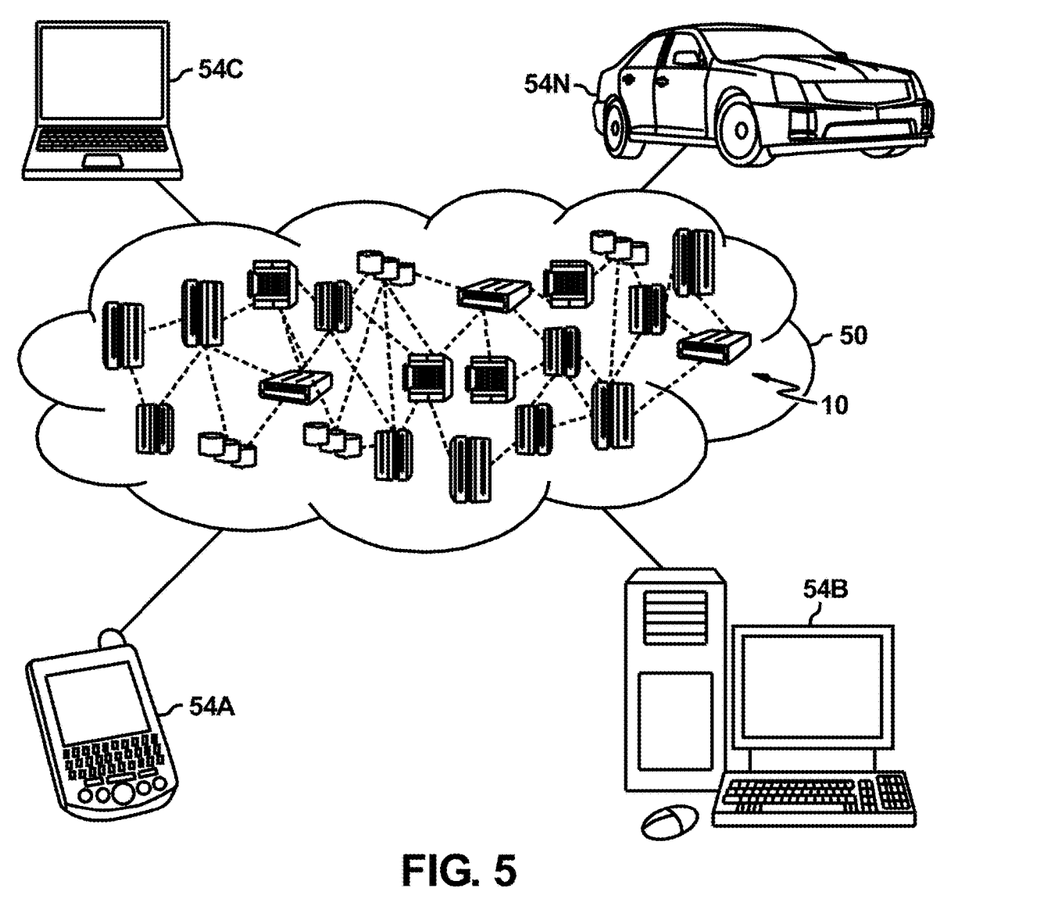
FIG. 5 depicts a cloud computing environment, according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
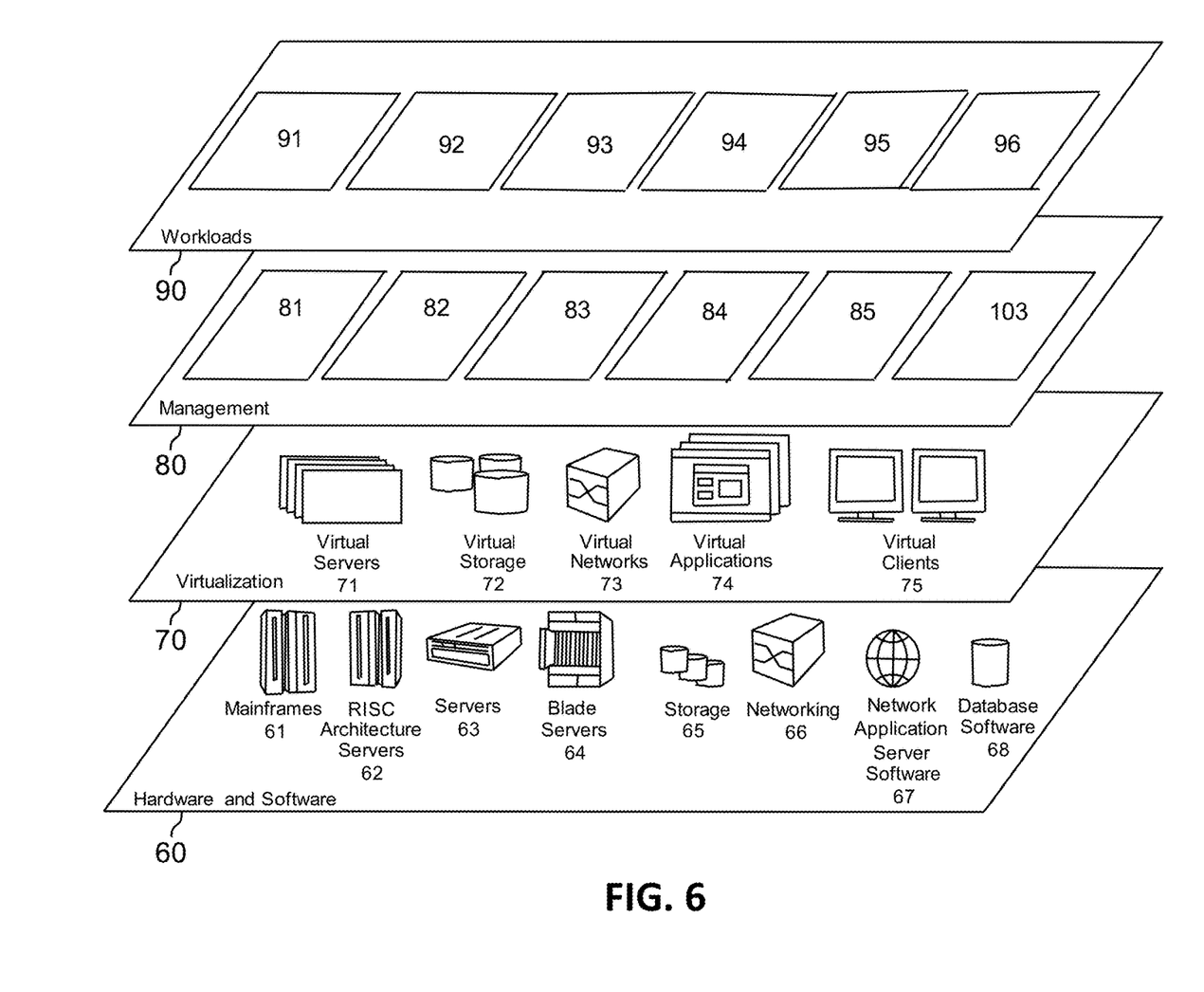
FIG. 6 depicts example abstraction model layers, according to an embodiment of the present invention.

Referring now to FIG. 6, a set of functional abstraction layers provided by a cloud computing environment 50 (FIG. 5) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide one or more of the functions described herein, such as workload orchestration system 103. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; mobile desktop 96; and/or the like.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for dynamic workload orchestration based on data complexity, the method comprising:
   receiving a workload for orchestration;
   analyzing the workload;
   generating a policy for complexity score computation based on information associated with the workload;
   organizing the workload into respective portions of the workload;
   computing complexity scores for the respective portions of the workload dynamically, wherein the complexity scores are computed at least in part based on parameters describing data associated with the respective portions of the workload, and wherein the complexity scores are computed at least in part based on the policy;
   assigning the respective portions of the workload to compute resources based on respective complexity scores of the respective portions of the workload; and
   executing load balancing and orchestration within the corresponding compute resources.

2. The computer-implemented method of claim 1, wherein the parameters describing the data associated with the respective portions of the workload comprise:
   data types;
   data size;
   volume of data; and
   variety of data types.

3. The computer-implemented method of claim 1, wherein the complexity scores are indicative of memory requirements for the respective portions of the workload.

4. The computer-implemented method of claim 1, wherein computing complexity scores for respective portions of the workload further comprises extracting metadata from the workload for use in computing the complexity scores.

5. The computer-implemented method of claim 1, wherein the complexity scores for respective portions of the workload are further based on a plurality of factors external to the workload, the factors further comprising:
   geographical data; and
   an external event.

6. The computer-implemented method of claim 1, wherein the method further comprises:
   tracking information associated with workloads and associated processing effort required for respective portions of the workloads; and
   training one or more machine learning models to predict the complexity of respective portions of a new workload based at least in part on the tracked information.

7. The computer-implemented method of claim 6, further comprising:
   using a first machine learning model of the one or more machine learning models to predict the complexity of the respective portions of the new workload.

8. A computer program product for dynamic workload orchestration based on data complexity, the computer program product comprising a computer readable storage medium having stored thereon:
   program instructions to receive a workload for orchestration;
   program instructions to analyze the workload;
   program instructions to generate a policy for complexity score computation based on information associated with the workload;
   program instructions to organize the workload into respective portions of the workload;
   program instructions to compute complexity scores for the respective portions of the workload dynamically, wherein the complexity scores are computed at least in part based on parameters describing data associated with the respective portions of the workload, and wherein the complexity scores are computed at least in part based on the policy;
   program instructions to assign the respective portions of the workload to compute resources based on respective complexity scores of the respective portions of the workload; and
   program instructions to execute load balancing and orchestration within the corresponding compute resources.

9. The computer program product of claim 8, wherein parameters describing the data associated with the respective portions of the workload comprise:
   data types;
   data size;
   volume of data; and
   variety of data types.

10. The computer program product of claim 8, wherein the complexity scores are indicative of memory requirements for the respective portions of the workload.

11. The computer program product of claim 8, wherein computing complexity scores for respective portions of the workload further comprises extracting metadata from the workload for use in computing the complexity scores.

12. The computer program product of claim 8, wherein the complexity scores for respective portions of the workload are further based on a plurality of factors external to the workload, the factors further comprising:
   geographical data; and
   an external event.

13. The computer program product of claim 8, wherein the computer readable storage medium has further stored thereon:
   program instructions programmed to track information associated with workloads and associated processing effort required for respective portions of the workloads; and
   program instructions programmed to train one or more machine learning models to predict the complexity of respective portions of a new workload based at least in part on the tracked information.

14. The computer program product of claim 13, further comprising:
   using a first machine learning model of the one or more machine learning models to predict the complexity of the respective portions of the new workload.

15. A computer system for dynamic workload orchestration based on data complexity, the computer system comprising:
   a processor(s) set; and
   a computer readable storage medium;
   wherein:
      the processor set is structured, located, connected, and programmed to run program instructions stored on the computer readable storage medium; and
      the stored program instructions include:
         program instructions to receive a workload for orchestration;
         program instructions to analyze the workload;
         program instructions to generate a policy for complexity score computation based on information associated with the workload;
         program instructions to organize the workload into respective portions of the workload;
         program instructions to compute complexity scores for the respective portions of the workload dynamically, wherein the complexity scores are computed at least in part based on parameters describing data associated with the respective portions of the workload, and wherein the complexity scores are computed at least in part based on the policy;
         program instructions to assign the respective portions of the workload to compute resources based on respective complexity scores of the respective portions of the workload; and
         program instructions to execute load balancing and orchestration within the corresponding compute resources.

16. The computer system of claim 15, wherein parameters describing the data associated with the respective portions of the workload comprise:
   data types;
   data size;
   volume of data; and
   variety of data types.

17. The computer system of claim 15, wherein the complexity scores are indicative of memory requirements for the portions of the workload.

18. The computer system of claim 15, wherein computing complexity scores for respective portions of the workload further comprises extracting metadata from the workload for use in computing the complexity scores.

19. The computer system of claim 15, wherein the complexity scores for respective portions of the workload are further based on a plurality of factors external to the workload, the factors further comprising:
   geographical data; and
   an external event.

20. The computer system of claim 15, wherein the stored program instructions further include:
   program instructions to track information associated with workloads and associated processing effort required for respective portions of the workloads;
   program instructions to train one or more machine learning models to predict the complexity of respective portions of a new workload based at least in part on the tracked information; and
   using a first machine-learning model of the one or more machine learning models to predict the complexity of the respective portions of the new workload.

* * * * *